350-6.3 SR

OR 3,856,377

United States Patent [19]

Wildhaber

[11] 3,856,377

[45] Dec. 24, 1974

[54] OPTICAL SCANNER WITH SINGLE OPTICAL HEAD

[76] Inventor: Ernest Wildhaber, 124 Summit Dr., Brighton, N.Y. 14620

[22] Filed: June 4, 1973

[21] Appl. No.: 366,775

[52] U.S. Cl. .......................... 350/6, 355/73, 355/76, 350/285

[51] Int. Cl. .......................... G02b 17/00

[58] Field of Search .......................... 355/73, 76; 178/7.6; 350/6, 7, 285

[56] References Cited

UNITED STATES PATENTS

| | | | |
|---|---|---|---|
| 2,478,555 | 8/1949 | Yule | 350/6 |
| 2,792,448 | 5/1957 | Deuth et al. | 350/6 |
| 3,677,643 | 7/1972 | Sagawa | 355/76 |

Primary Examiner—Ronald J. Stern
Assistant Examiner—Michael J. Tokar

[57] ABSTRACT

A record bearing distinct parallel lines of characters is wrapped on a cylindrical rotor surface in a position so that the character lines extend approximately in the direction of the rotor periphery and that the scanning line follows the character lines at exactly the same level. The record is held on the cylinder surface in two spaced regions following opposite sides of the record, preferably by suction. Relative motion axially of the rotor is effected between the rotor and a scanning head. The rotor is reversed after scanning. The record is unloaded during reverse rotation of the rotor, releasing first the leading side and then the trailing side as unwrapping is near completion.

11 Claims, 15 Drawing Figures

OPTICAL SCANNER WITH SINGLE OPTICAL HEAD

One object of the invention is to provide a scanner with single optical scanning head for scanning lines of characters, and a method of scanning along a line that follows the line of characters at exactly the same level all along said line.

Another object is to improve loading of the record on the rotor and its unloading therefrom. A further aim is to provide means for placing the record in a predetermined position on the rotor.

A still other aim is to hold the record on the rotor in two spaced regions adjacent opposite sides of the record, and to release said hold successively as the record is unwrapped from the turning rotor.

Another object is to scan while the rotor turns in one direction and to unload and release the record while the rotor turns in opposite direction at increased speed.

A still other object is to hold the record on the rotor by suction applied in two spaced regions adjacent the left and right sides of the record.

A further aim is to apply independent suction to said two regions through opposite ends of the cylindrical rotor surface on which the record is held.

Another aim is to provide a scanner operating according to the method described in the specification.

Other objects will appear in the course of the specification and in the recital of the appended claims.

The invention will be described with the drawings, where

Figures 1, 2, 3, 4, 5, 6, 7, 8, 9, 10, 11:
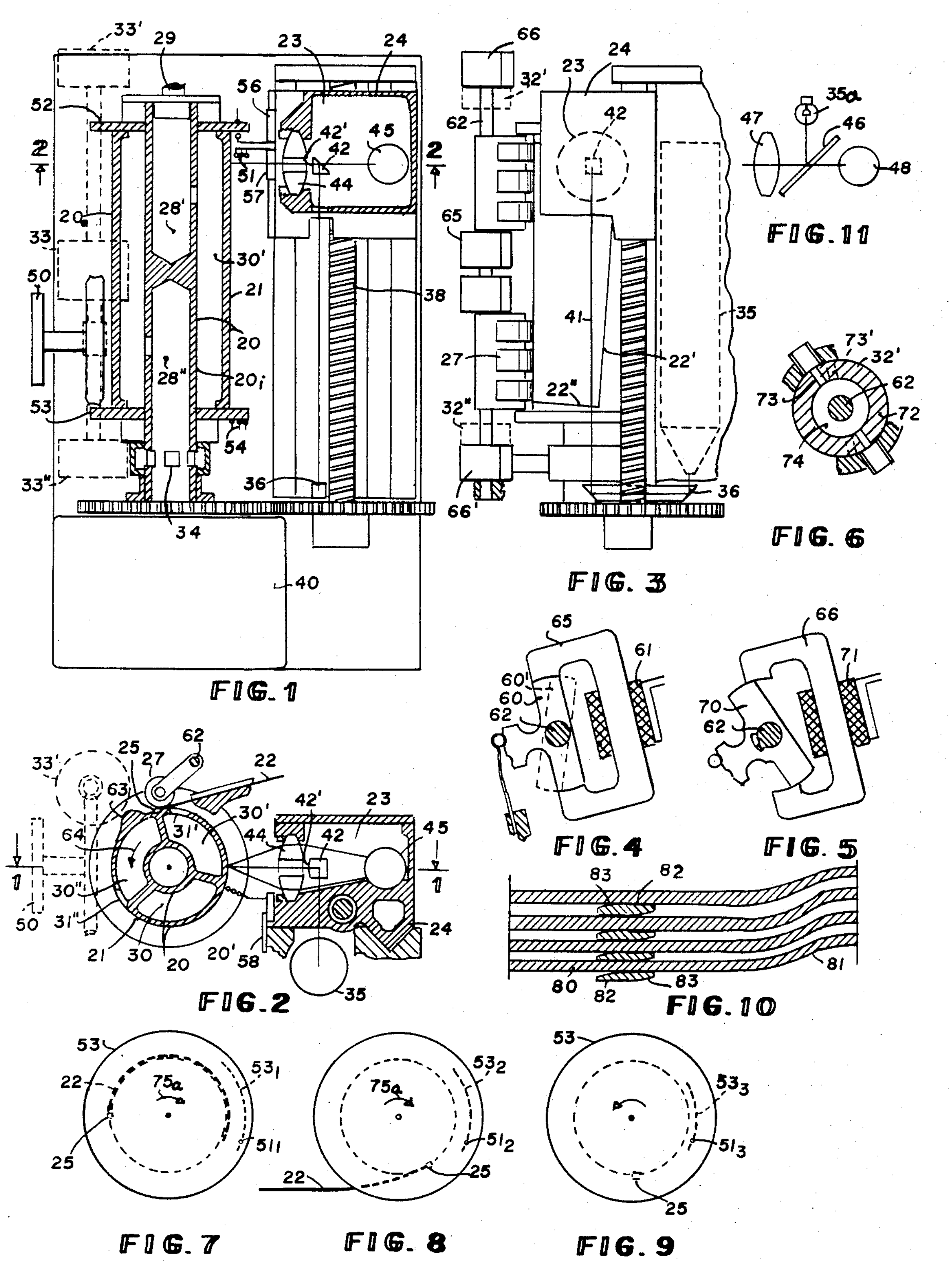
FIG. 1 is a section of a scanner laid through the rotor axis, along lines 1-1 of FIG. 2.
FIG. 2 is a cross-section taken at right angles to the rotor axis, along lines 2—2 of FIG. 1.
FIG. 3 is a side view corresponding to FIG. 1, the portion for guiding a record onto the rotor surface being omitted for clarity.
FIG. 4 is a diagrammatic view showing a magnetic device for lowering rollers 27 (FIGS. 3 and 2) to the cylindrical rotor surface for wrapping a record onto said surface as the rotor turns. The view is along the axis of the part that lowers the rollers.

FIG. 5 is a similar view of a device whose pivoted portion is coaxial with the pivoted portion of the device shown in FIG. 4. Said portion is moved to the shown tilted position by the action of the device shown in FIG. 4, while its electro-magnet is without current. It then connects the suction channels.

FIG. 6 is a section parallel to that of FIG. 5, showing the suction line connected, and in dotted lines shut off.

FIGS. 7 to 9 are diagrams showing flange 53 of rotor 20 in different turning positions to provide various electric contacts.

FIG. 10 is a development to a plane of the mean cylindrical surface of a stepping screw that provides axial displacement only between scanning adjacent character lines. It also shows the abutment cooperating therewith.

FIG. 11 is a fragmentary view taken in the same direction as FIG. 1, but showing a different light source.

Figure 12:
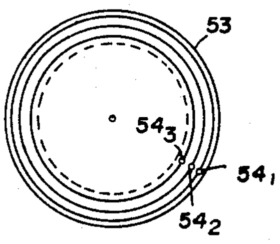

FIG. 12 is a diagrammatic end view of flange 53, looking up in FIG. 1.

Figure 13:
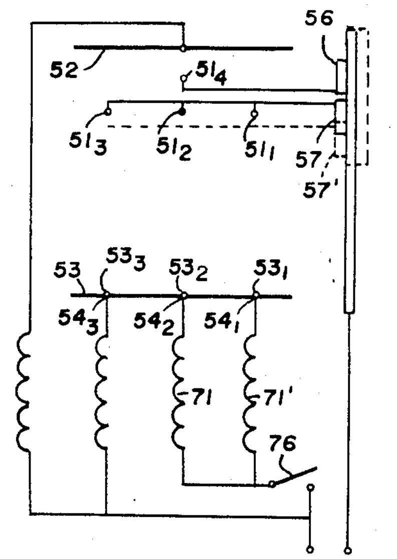

FIG. 13 is a diagram showing the electric circuits for operating various scanning steps.

Figure 14:
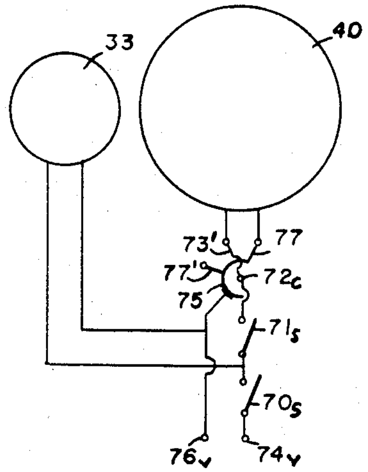

FIG. 14 is a diagram showing the electric circuits for the reversing motor that drives the rotor and the motor for driving the suction pumps.

Figure 15:
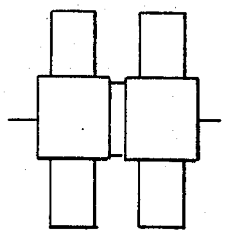

FIG. 15 is a rear view of further magnetic devices similar to those of FIGS. 4 and 5. Their pivot parts are coaxial.

In FIGS. 1 to 3, the rotor 20 contains a cylindrical outside surface 21 coaxial with its axis of rotation, for receiving a record 22. An optical scanning head 23 directs illumination to a small record area that is preferably a line-like area much longer than wide, and that extends approximately at right angles to the character lines of the record, and approximately in the direction of the rotor axis. Feed motion is provided in the direction of the rotor axis between head 23 and rotor 20. In the illustrated embodiment the feed is performed by a slide 24 that carries optical head 23, while the rotor turns in an axially fixed position.

The feed may be continuous during scanning and in direct proportion to the turning motion of the rotor, or also it may be intermittent, without feed during scanning and feed from one line of characters to the next line between the end of one line and the start of the next. In both cases the sides of the record are kept approximately parallel to the rotor axis. These sides are at right angles to the character lines and are usually the longer sides of the record. When using intermittent feed the record is mounted on the rotor with its sides exactly parallel to the rotor axis. In the first-named case, that is often preferred, the sides of the record are kept at a slight inclination less than three degrees to the direction of the rotor axis, so that the character lines extend along a single helix on the rotor, the helical lead being equal to the axial pitch of the character lines on the cylindrical surface, and to the axial spacing of successive scanning passes. FIG. 3 shows with exaggeration a record thus positioned on the rotor. The sides of the record, such as right side 22', extend on the cylindrical rotor surface along a helix of very large lead, while end 22'' extends almost peripherally of the rotor.

The record 22 is admitted while the rotor and feed are preferably at standstill. The left side of the record, looking at its front, is brought into contact with a guide-rail 25 (FIG. 2), while its top bears against an abutment (not shown). The guide-rail and abutment match the required direction of the left side and top of the record. Guide-rail 25 extends either parallel to the rotor axis or along the helix of large lead.

In the embodiment particularly described the turning motion of the rotor is reversed after scanning together with the feed, both the rotor and the slide with optical head returning to starting position. Also the record is preferably held on the cylindrical rotor surface by suction applied along its opposite sides. The scanning cycles containing the following steps:

a. A record sheet is admitted to bear with its left side against a guide-rail (25) provided on the rotor.

b. Rollers (27) are lowered onto the record while the rotor is started to turn. Simultaneously suction is applied through both rows of suction channels provided on the rotor. Said rows follow opposite record sides. Suction is ineffective on the right record side as long as the record has not been fully wrapped on the cylinder.

c. Rollers 27 are withdrawn after the record has been completely wrapped on the cylinder and before the rotor has completed a full turn.
d. The record is scanned as the rotor continues to turn and axial feed motion is effected in time with the turning motion, either uniform feed or stepwise feed.
e. After scanning the turning and feed motions are reversed.
f. At a suitable turning position close to reversal, suction is ended adjacent the former trailing side and now leading side of the record, so that it becomes loose and starts to detach itself from the cylinder by centrifugal inertia and air resistance.
g. When the record is almost completely unwrapped from the cylinder suction is ended also adjacent the now trailing side, releasing the record completely from the cylinder.
h. When reaching starting position the turning and feed motions are stopped and simultaneously the reversing switch is operated, starting a dwell for loading.

The cycle then starts over again.

Rotor 20 contains a central shaft-like portion $\mathbf{20}_i$ and an outer rim $\mathbf{20}_o$. Portion $\mathbf{20}_i$ contains two opposite coaxial bores 28', 28'' that are separated from each other. Spoke-like arms connect the central portion with the outer rim and form a plurality of separate compartments 30, 30', 30''. Bore 28' communicates with compartment 30', while bore 28'' communicates with the compartment 30''. A row of very thin slits 31' extends the whole length of the cylindrical surface within reach of the left side of the record to apply suction for holding said side on the cylindrical surface 21. Slits 31' (FIG. 2) connect the outside surface with compartment 30'. Another row of slits 31'' is provided to hold the right side of the record on cylinder 21. They connect compartment 30'' with the outside surface.

Compartment 30' communicates through bore 28' with a pipe or hose 29 attached at one end of the rotor 20. The connection passes through a valve 32', shown in FIG. 6 and in dotted lines in FIG. 3, to a rotary pneumatic suction pump 33' shown in dotted lines in FIGS. 1 and 2. Compartment 30'' is connected through bore 28'' and openings 34, adjacent the opposite end of the rotor, with suction pump 33'' through a similar valve (32''). Suction applied through the two sets of slits 31', 31'' thus is independent one of the other. It is shut off at different times. Instead of the slits rows of fine bores may be used, if desired.

In the embodiment illustrated in FIGS. 1 to 3 optical head 23 is movable in direct proportion to the turning motion of the rotor, being moved by a conventional screw 38 geared to the rotor. Rotor 20 is driven by a reversing motor 40. Thus both the rotor and head 23 return to starting position in each scanning cycle.

A gas laser 35 provides illumination. It rests in the stationary base of the apparatus, and emits a small bundle of rays practically parallel to the rotor axis. They are directed to the level of said axis by a double prism 36, being reflected at two inclined plane surfaces that act as mirrors. At this new level also the rays remain parallel to the rotor axis.

The path 41 of the laser rays reaches a further prism 42 on the optical head. Prism 42 reflects the rays and directs them radially towards the cylindrical surface 21. Side 42' of prism 42 has a convex profile, (FIG. 2), so that the parallel rays are focussed to a narrow area that appears line-like, on the rotor surface 21. Side 42' may extend along a cylindrical surface having straight-line elements in the view of FIG. 1. Then the height of the illuminated line-like area is equal to the diameter of the beam emitted by the laser. Other heights may be had by curving also the profile visible in FIG. 1. The said cylindrical surface 42' is preferably so placed that the illuminated line-like area extends perpendicular to the lines of characters.

Light reflected from the illuminated record area is gathered by a lens 44 and directed to a photocell 45, or light-sensitive means capable of converting light fluctuations into fluctuations of electric current. Lens 44 has a hole at its center to let the laser light through to the record.

While I preferably use records containing a bar code, the invention is not confined thereto. In this latter case I may use an optical head amply enlarging the image of the illuminated line-like area, and direct light at a sufficient number of points thereof to an equal number of photocells, one for each point.

It should be noted that the illumination by a stationary laser is unaffected by the feed position of slide 24, as the laser rays are practically parallel and path 41 extends in the direction of slide travel.

When a plurality of scanners are used at the same place, a common large suction pump may replace the two individual pumps of each unit.

The modification shown in FIG. 11 uses an incandescent bulb $\mathbf{35}_a$ carried by the feed slide (24). Its light is partly reflected at beam splitter 46 and focussed by lens 47 on the record. The light reflected therefrom again passes through lens 47 and part of it reaches photocell 48.

In automatic operation of either embodiment some of the scanning steps, particularly the end of the dwell for loading, are initiated by a cam 50 geared to make one complete turn per scanning cycle. As the rotor makes a large number of turns per cycle it is desirable to initiate some other steps, such as shutting off suction, by portions on the rotor, so that they occur at more precisely the desired rotor turning position. Electric contacts are made close to the end positions of slide 24 in its feed motion. They are made at the prescribed moment by contact of elements 51 ($\mathbf{51}_1$, $\mathbf{51}_2$, $\mathbf{51}_3$, $\mathbf{51}_4$ ) with insulated portions embedded in the flanges 52, 53 of the rotor on the sides facing each other. These portions are shaped to reflect the relative motion of slide 24, and are connected respectively with concentric circular and insulated portions provided on the outside of said flanges, that is on the sides facing away from each other, FIG. 12. Brushes 54 ($\mathbf{54}_1$, $\mathbf{54}_2$, $\mathbf{54}_3$, $\mathbf{54}_4$ ) shown summarily in FIG. 1 and more explicitly in FIG. 13 keep the respective circuits connected, if said contact is made.

Electric current due to such contact passes through an actuator to one of two points having an electric potential or voltage with respect to each other.

Element 51 adapted to engage flange 52 is connected with a part 56, and the elements 51 adapted to engage flange 53 are connected with a part 57. Parts 56, 57 are adjustable on slide 24 to change the length and position of the scanning feed. A stationary bar 58 takes current off parts 56, 57 as it slides thereon. Bar 58 appears in FIG. 2. It is connected with the other of said two points of relative voltage.

One form of actuator is diagrammatically indicated in FIG. 4. It comprises an electro-magnetic circuit with pivoted bar 60 and coil 61. Direct current in coil 61 moves bar 60 from the dotted position 60' to the shown full-line position. The rollers 27 (FIGS. 2, 3) are thereby moved by shaft 62 of the bar into engagement with the record on cylindrical surface 21. The rollers are disengaged again by a projection 63 (FIG. 2) of the rotor before the rotor has completed a full turn in the direction of arrow 64, and after the record has been completely wrapped on cylinder 21. Stops are provided by a pin resiliently pressed into one of two recesses provided on the pivoted part 60.

There are a number of other suitable known actuators, including a solenoid-operated magnetic circuit.

The actuator of FIG. 4 is shown at a smaller scale in FIG. 3, at 65. Arranged coaxially with it is a similar actuator 66, FIGS. 5, 3. It controls suction through hose 29 at the upper end of the rotor shown in FIG. 1. Actuator 66 is loosely keyed to shaft 62. As shaft 62 turns to the bar position shown in FIG. 4 the bar 70 of actuator 66 is turned to the tilted position shown, through the engagement of the key provided on shaft 62 and in the absence of electric current in coil 71. It is retained in this position by stops like those shown in FIG. 4, and remains in this position when bar 60 (FIG. 4) is returned to the dotted position 60' by rotor projection 63.

In this tilted bar position shown in FIG. 5 suction is applied through slits 31' (FIG. 2). The connection is made by valve 32' shown in cross-section in FIG. 6 and dotted in FIG. 3. It is set adjacent actuator 66. The ring-shaped portion 72 of valve 32' is rigid with bar 70. The connection in the suction line is through openings 73 and central recess 74. When bar 70, (FIG. 5) is brought into aligned position by direct electric current admitted to coil 71 the openings of valve portion 72 are in the dotted position 73'. This shuts off the suction connection for releasing the record.

Another actuator 66' controls suction through slits 31'' and through the opposite end of cylindrical surface 21. It is identical with actuator 66 shown in FIG. 5. It is loosely keyed in the same manner to shaft 62. This suction is shut off, and release of the record starts in the turning position shown in FIG. 7, when element $\mathbf{51_1}$ contacts portion $\mathbf{53_1}$ embedded in flange 53 and shown in dotted lines in FIG. 7. Arrow $\mathbf{75_a}$ indicates the direction of rotation during return. Guide rail 25 shows the turning position.

FIG. 8 shows the rotor position when actuator 66 shuts off suction to release the record completely. Conventional valves are provided to permit air intake when suction is shut off.

It is seen that lowering the rollers 27 into engagement, as obtained with actuator 65, also moves the actuators 66, 66' and starts suction. Suction is ended independently by actuators 66, 66' at the required turning positions of the rotor.

The connections are further shown in diagram FIG. 13, where the numerals denote the same parts as in the previous figures. The actuators are represented by their coils, such as 71, 71' for actuators 66, 66'. Inasmuch as the contact of elements 51 occurs twice in each scanning cycle, going and coming back, and the actuators 66, 66' should shut off suction only in going back, the electric circuits are kept open and inoperative during the scanning pass by a switch 76. They are closed only during the return. Switch 76 may be operated together with the reversal switch.

Contact of element $\mathbf{51_3}$ initiates the reversal switch and simultaneously closes switch 76 at the end of the scanning path. Contact of element $\mathbf{51_4}$ starts the dwell for loading, after return to standing position, and simultaneously operates the reversal switch and opens switch 76. Cam 50 ends the dwell and energizes actuator 65, starting the cycle.

Hand operation may be substituted for the action of cam 50.

FIG. 15 is a rear view of a further pair of actuators with common shaft, where one actuator under electric current operates the other actuator in one direction, while said other actuator is without current, as described for actuators 65, 66.

FIG. 14 is a simplified diagram showing the wire connection between the reversing motor 40 and motor 33. An open switch $\mathbf{70_s}$ ends the current supply in both motors. When switch $\mathbf{70_s}$ is closed an open switch $\mathbf{71_s}$ shuts off the reversing motor 40 only, leaving motor 33 running, as desired with mechanical loading. With hand loading both motors are preferably shut off after each scanning cycle. Switch $\mathbf{71_s}$ remains closed.

The reversing switch is diagrammatically illustrated by a pivot member with axis $\mathbf{72_c}$ containing an arm 73'. Said arm is connected through switches $\mathbf{71_s}$, $\mathbf{70_s}$ with one pole $\mathbf{74_v}$. It also contains a circular portion 75 connected with the other pole $\mathbf{76_v}$ that has a voltage difference with respect to pole $\mathbf{74_v}$. Two arms 77, 77' reach out from portion 75. Turning this switch about axis $\mathbf{72_c}$ reverses the connection with poles $\mathbf{74_v}$, $\mathbf{76_v}$.

FIG. 10 shows with exaggeration the development into a plane of a mean cylindrical surface laid through the thread of a special screw that provides stepwise feed. It provides standstill of the optical head while a line of characters is being scanned, and feed between scanning the end of one line of characters and starting on the next line. The screw contains major thread portions 80 that extend in circles about the axis of the screw, and thread portions 81 that provide stepwise feed. The threads contact a toothed part rigid with the optical head. The circular thread portions contact matching portions 82 of said part, while its convexly curved portions 83 are adapted to contact thread portions 81. The several convex portions 83 are preferably identical surfaces of revolution about an axis parallel to the axis of the screw, such as conical or spherical surfaces capable of being represented by rotating cutting tools.

Numerous modifications may be made in my invention without departing from its spirit. For definition of its scope it is relied on the appended claims.

What I claim is:

1. The method of optically scanning records bearing characters arranged in distinct parallel lines, which comprises providing an optical head and a rotor containing a cylindrical surface coaxial with its axis of rotation, effecting turning motion of said rotor on its axis, wrapping a record sheet on said cylindrical surface, with the character lines extending approximately in the direction of the rotor periphery, by first attaching the leading record side thereto, pressing the record onto said cylindrical surface as the rotor turns, without further attaching it, and attaching the trailing record side thereto as wrapping nears completion, lighting the record through said optical head, effecting feed motion between said head and rotor axially of the rotor in time with the turning motion of said rotor, for scanning the character lines of the record, gathering light reflected from a small lighted area of the record and directing it to means adapted to produce variations in electric current in accordance with the light variations received, reversing said turning and feed motions after scanning to return to starting position at increased speed, and releasing first the former trailing side of the record from the cylindrical surface after reversal and later releasing the opposite side as the record becomes unwrapped.

2. The method according to claim 1, wherein the record is placed on the cylindrical surface in a position such that the scanning path follows the character lines at an exactly constant level all along their length.

3. The method according to claim 1, wherein said turning and feed motions are started while rolling means are lowered to keep the record pressed to the cylindrical surface of the rotor until it is completely wrapped up on said surface.

4. The method according to claim 1, wherein independent suction is used to keep opposite sides of the record sheet pressed against the cylindrical surface of the rotor, maintaining said suction during scanning and then releasing said sides successively.

5. An optical scanner for scanning records bearing characters arranged in distinct parallel lines, comprising a cylindrical rotor for wrapping a record onto with said lines extending approximately in the direction of the rotor periphery and including an angle less than three degrees with said direction, means for holding said record on said rotor only in two separated regions adjacent opposite ends of said lines, means for turning said rotor on its axis so that during scanning the left side of said record is the leading side and the right side is the trailing side, means for emitting light from a small area, lens means for forming an image of said area on the record whereby the thus illuminated record area moves along a line of characters as the rotor turns, means for effecting relative displacement between said lens means and said rotor in the direction of the rotor axis to scan line after line, means for directing only light reflected from a line-like illuminated record area to photosensitive means, to cause electric currents expressing the varying intensity of said reflected light, said line-like area extending approximately in the direction of the rotor axis, and means for successively releasing the hold on opposite sides of the record on the rotor for unloading the record after scanning as the rotor turns.

6. An optical scanner according to claim 5, wherein means are provided for reversing the rotor after scanning, and means for unloading the record during the reverse run of the rotor.

7. An optical scanner according to claim 5, wherein means are provided to focus light to a narrow line-like area of the record, said area extending approximately in the direction of the rotor axis.

8. An optical scanner according to claim 5, wherein pneumatic suction means is provided for holding the record on said cylinder on opposite sides of the record, said suction means being applied independently from opposite ends of the rotor, and means for releasing the hold on opposite record sides successively.

9. An optical scanner according to claim 5, wherein the rotor is axially fixed, the lens means is mounted on a slide adapted to move axially of the rotor in time with its rotation.

10. An optical scanner according to claim 5, wherein the full circumference of the cylindrical rotor surface that receives the record is larger than the width of the record and smaller than double said width.

11. In an optical scanner according to claim 5, a cylindrical roller for keeping the record pressed against the cylindrical rotor surface as it is wrapped thereon, and means for starting the turning motion of the rotor as said roller is advanced into operating position.

* * * * *